United States Patent [19]

Vaagland

[11] Patent Number: 4,781,763
[45] Date of Patent: Nov. 1, 1988

[54] METHOD FOR CLEANING THE NET BAG OF BREEDING ENCLOSURES

[75] Inventor: Einar B. Vaagland, Vågland, Norway

[73] Assignee: Vaagland Mek. Verksted A/S, Vagland, Norway

[21] Appl. No.: 35,320

[22] Filed: Apr. 7, 1987

[51] Int. Cl.[4] .............................................. B08B 30/00
[52] U.S. Cl. ....................................... 134/26; 134/32; 134/33; 119/4; 8/158; 210/403
[58] Field of Search .................... 134/25.1, 33, 25.4, 134/24, 26, 32; 119/4; 8/150, 158, 59, 139, 156; 210/217, 393, 394, 402, 403

[56] References Cited

U.S. PATENT DOCUMENTS 4,306,975 12/1981 Siewert .............................. 210/394
4,489,574 12/1984 Spendel ................................ 68/58

Primary Examiner—H. M. S. Sneed
Assistant Examiner—Sharon T. Cohen
Attorney, Agent, or Firm—Pollock, VandeSande and Priddy

[57] ABSTRACT

A method for cleaning the net bag for breeding enclosures, seines, and the like utilizes a rotatable driven drum, known per se, with an insert opening for the net bag and radial inward projecting ridges, as well as an inlet and outlet for washing and rinsing water. Said inlet for water continuously supplies water during the entire period of operation, and the outlet is continuously open during the entire period of operation. The inlet for water consists of axially directed openings or nozzles which may be arranged in a cross-shaped pattern with their point of intersection in the center of said drum. The outlet consists of a number of axial open slots in the drum shell. The water pressure in and the area of said inlet openings are adapted to the area of the outlets in such a manner that the drum is approximately free for water during operation. The height of each ridge constitutes at least 10% of the drum diameter.

2 Claims, 2 Drawing Sheets

METHOD FOR CLEANING THE NET BAG OF BREEDING ENCLOSURES

The present invention relates to a method and a device for cleaning the net bags of breeding enclosures, or the like.

Most fish breeding plants for fish for consumption, today use breeding enclosures with a net bag immersed in the water in a fjord or a shielded area where there is sufficient current to ensure replacement of water. The net bags are steadily immersed in water, and pelagic blue mussel fry adhere to the mesh threads, and then clusters of mussels develop rapidly on the bag. Especially due to the large supply of nutriments fed to the water when the fish in said enclosures is fed, there will be strong growth of algae, green seaweed, and the like in said net bag. This will clog the net bag so that free supply of water through the meshes is reduced, and the result is that said net bags must often be taken ashore for cleaning. Today, this is carried out by lifting the bag step by step by the aid of a crane and washing it down by the aid of high pressure jets, one area at a time. This is a time consuming as well as labour consuming operation, usually taking from 5 to 8 hours with several persons participating in the task. Such cleaning of the net bags for breeding enclosures alone constitutes between 40 and 50% of the work at a fish breeding plant. Obviously, this is of great importance to the economy of a plant. Until now the financial situation in this industry was good enough not to make improvement of efficiency a must, but in the future more keen competition is to be expected from other countries, and it will then be necessary to reduce the need for manpower, especially in a high cost country like Norway.

First and foremost, it is an object of the invention to provide a method for less expensive and more rapid cleaning of the net bag of breeding enclosures.

No apparatus for cleaning net bags for breeding enclosures were previously proposed, and it is, thus, another subject of the invention to provide such an apparatus which can automatically clean a net bag in the course of a fraction of the time it takes with the method previously used.

According to the invention this is achieved by a method that is characterized by the fact that the net bag, released from buoyancy bodies and moorings, is introduced into a rotatable driven drum provided with axially extending ridges facing inward, that said net bag is washed by the aid of pressurized water continuously sprayed through nozzles in the internal drum wall, and that water and washed off matter is during the entire washing operation drained off through opening in said drum.

The apparatus according to the invention is characterized by the fact that it comprises a rotatable driven drum, known per se, and having an inlet opening for the net bag and radially projecting ridges, as well as supply and outlet means for washing water, said water supply means being designed for continuous supply of water during the entire operating period, and that said outlet means are continuously open during the entire operating period, that said water supply means consist of axially directed openings or nozzles inside said drum provided in a cross shaped pattern with the point of intersection at the center of said drum.

The apparatus according to the invention carries out a combined washing and rinsing operation during the entire operation with removal of mussels and other growth from the net bag and out of said drum through said continuously open outlet openings. Surprisingly, very strong and rapid removal of growth from the net bag is achieved by continuous supply of water which is sprayed or spurted onto the net bag inside said drum, and by continuous removal of water from said drum, preventing any volume of water to build up inside the drum.

The reason for such rapid and efficient cleaning is probably that the wet and heavy net bag is very vigorously worked inside said drum by the aid of the inward projecting ridges. Said ridges have a considerable height or radial projection, in a preferred embodiment of the invention at least 10% of the internal diameter of said drum and will, thus, be able to lift the net bag to a high level inside the drum, and they will have a strong impact on the net bag when it falls down in the drum. There being very little water in said drum the effect of the impact of said ridges on the net will not be subdued. Such impact on the wet net bag will cause mussels and other growth to be knocked off the mesh threads, and the released material will be continuously washed through the outlet openings to be removed from the drum. Tests showed that a net bag with a diameter of approximately 40 m and a depth of approximately 5 m, i.e. a net bag of approximately 100 m$^2$, is cleaned in the apparatus according to the invention in less than half an hour.

The invention is disclosed in more detail below with reference to the drawings showing an embodiment of the apparatus according to the invention.

As shown in FIGS. 1-4 the apparatus according to the invention essentially comprises a thin sheet drum 1 which is provided to be rotated on a support 2 and has an insert opening 3. Inside said drum four sturdy ridges 4 are provided evenly spaced on the drum periphery (see FIG. 3). Said ridges have a height or radial projection that is at least 10% of the internal diameter of said drum. In the shown embodiment the drum diameter is approximately 2.4 m and the length is approximately 1.2 m. The height of said ridges is 40 cm.

Figure 1:
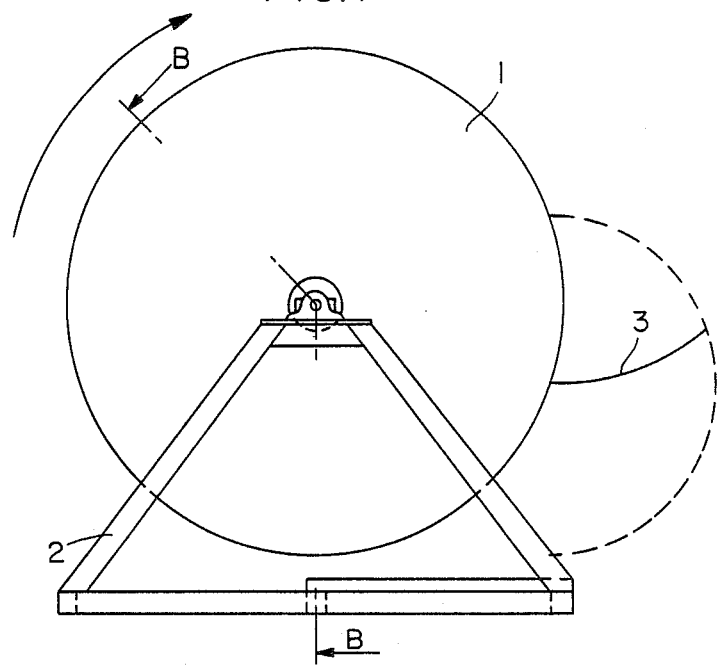
FIG. 1 shows the drum-shaped apparatus for cleaning net bags for breeding enclosures in a side elevation.
Figure 2:
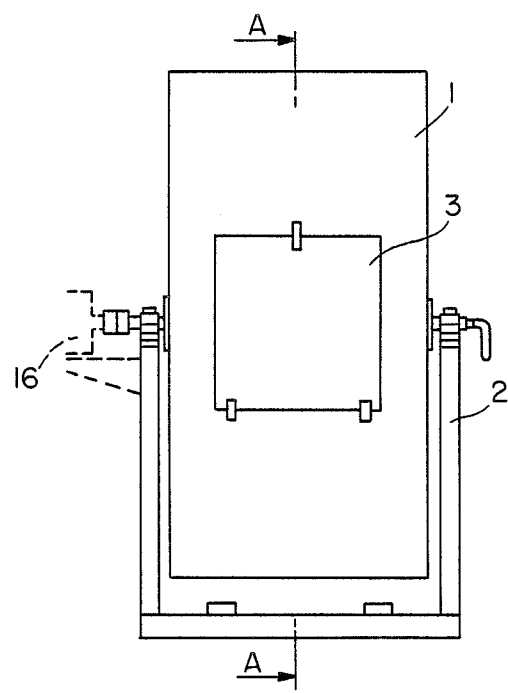
FIG. 2 shows an end view of said apparatus.
Figure 3:
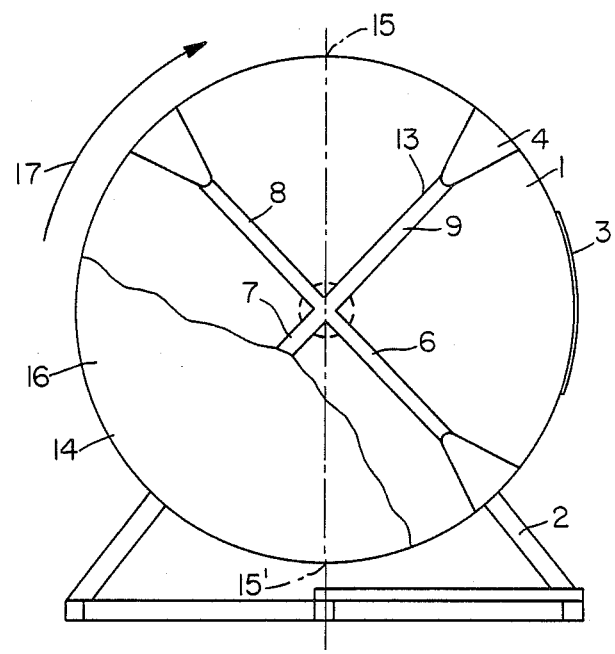
FIG. 3 is a sectional view along line A—A in FIG. 2.
Figure 4:
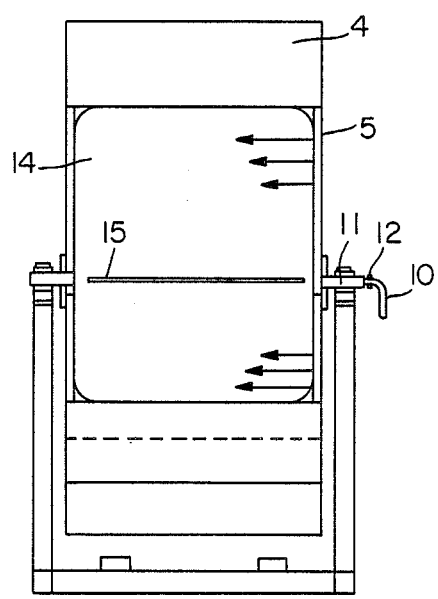
FIG. 4 is a sectional view along line B—B in FIG. 1.

Four water channels 6, 7, 8, and 9 are provided inside said drum in one of the end walls of the drum (FIG. 3). Said channels extend radially from the center of the drum, thus, forming a cross-shaped pattern. Water is supplied to said channels from a pipe 10 through the hollow drum shaft 11 via a swivel 12 (FIG. 4). Channels 6, 7, 8, and 9 have a number of openings or nozzles 13 for water (FIG. 3). In the shell 14 of the drum a number of outlet slots 15 for water are provided (FIG. 4). Drum 1 is rotated by the aid of a diagrammatically indicated motor 16. In FIG. 3 the apparatus is shown in operation to clean a net bag 16 which is lifted in the direction of arrow 17 by ridges 4, all the way to the top of drum 1, before it falls down again onto the bottom of the drum. This operation is carried out continuously, water being continuously supplied. Mussles and other growths will be continuously carried away with effluent, especially through outlet slot 15′, when said slot is facing downwards, as shown in (FIG. 3.)

Having described my invention, I claim:

1. The method of cleaning accumulations of algae, seaweed, mussels and other growth from the mesh threads of a large, wet and heavy net bag that has been used as a breeding enclosure moored in an immersed state in a body of water forming a portion of a fish breeding plant, comprising the steps of releasing the net bag from the net bag mooring, removing the net bag with the accumulated growth thereon from said body of water and placing the entire bag within a rotatable drum, the drum being mounted for rotation about a horizontal axis and having a plurality of spaced outlet openings therein for the egress of said accumulations from the interior of said drum, and the interior of the drum also being provided with a plurality of spaced ridges that extend substantially radially toward the center of said drum with each such ridge having a radial length that is at least 10% of the internal diameter of the drum, continually rotating said drum in a single direction to cause said ridges to regularly lift said net bag from the bottom to the top of the drum whereafter said net bag drops under the influence of gravity back to the bottom of the drum, continually spraying wash water under pressure, through water inlet openings in the drum, into the interior of said drum as the drum is rotated and as said net bag is lifted and dropped therein to cause portions of said accumulated growth to be knocked off of the mesh threads of the net bag by the combined action of the wash water spray and the impact of said net bag against the spaced ridges and interior walls of the drum, said wash water being sprayed under pressure into the interior of said drum from a side wall of the drum in a plurality of spaced water jets each of which is directed generally parallel to the axis of rotation of the drum, continually draining the wash water and said portions of said accumulated growth for the interior of said drum via said openings during the continued spraying of said wash water and the continued rotation of said drum until said net bag is substantially free of all said accumulated growth, and so correlating the pressure of said sprayed water and the size of said water inlet openings to the area of said outlet openings that the interior of said drum remains substantially free of water build-up during the cleaning of said net bag.

2. The method of claim 1 wherein said plurality of water jets are arranged in a cross-shaped pattern.

* * * * *